(12) United States Patent
Gade et al.

(10) Patent No.: US 9,696,454 B1
(45) Date of Patent: Jul. 4, 2017

(54) IDENTIFYING WEIGHTING MATERIAL SAG WITH PULSED NEUTRON LOGS

(71) Applicant: Baker Hughes Incorporated, Houston, TX (US)

(72) Inventors: Sandeep Gade, Spring, TX (US); Qiong Zhang, Houston, TX (US); David Chace, Houston, TX (US); Feyzi Inanc, Spring, TX (US); Otto N. Fanini, Houston, TX (US); Yonghwee Kim, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/989,472

(22) Filed: Jan. 6, 2016

(51) Int. Cl.
*E21B 47/00* (2012.01)
*G01V 5/10* (2006.01)

(52) U.S. Cl.
CPC .............. *G01V 5/102* (2013.01); *E21B 47/00* (2013.01)

(58) Field of Classification Search
CPC ................................ E21B 47/00; G01V 5/102
See application file for complete search history.

(56) References Cited

U.S. PATENT DOCUMENTS

| | | | |
|---|---|---|---|
| 3,256,438 A | 6/1966 | Armistead | |
| 3,435,216 A | 3/1969 | Givens | |
| 3,780,301 A | 12/1973 | Smith, Jr. | |
| 4,604,522 A * | 8/1986 | Arnold | G01V 5/125 250/264 |
| 6,176,323 B1 | 1/2001 | Weirich | |
| 2006/0091307 A1* | 5/2006 | Griffiths | G01V 5/045 250/262 |
| 2012/0119077 A1* | 5/2012 | Smaardyk | E21B 43/04 250/269.3 |
| 2013/0009049 A1* | 1/2013 | Smaardyk | E21B 43/04 250/269.3 |
| 2014/0042311 A1* | 2/2014 | Zhou | G01V 5/102 250/269.8 |
| 2014/0339410 A1* | 11/2014 | Zhou | G01V 5/108 250/256 |
| 2015/0192694 A1* | 7/2015 | Bordakov | G01V 11/00 702/6 |
| 2016/0003025 A1* | 1/2016 | Beekman | G01V 5/104 250/269.5 |
| 2016/0202387 A1* | 7/2016 | Fox | E21B 47/0005 73/152.58 |

* cited by examiner

*Primary Examiner* — Mark R Gaworecki
(74) *Attorney, Agent, or Firm* — Bracewell LLP; Keith R. Derrington

(57) ABSTRACT

A method of identifying barite in a subterranean annulus that surrounds a wellbore, where the method includes detecting gamma rays in the wellbore that are generated from the annulus, obtaining a count rate of the detected gamma rays, comparing the count rate with reference data, and determining the presence of barite in the wellbore based on the comparison. The count rate can be a ratio of counts of detected gamma rays obtained from spaced apart receivers on a downhole tool, or a ratio of detected inelastic and capture gamma rays. The reference data is obtained by using a simulation algorithm.

18 Claims, 7 Drawing Sheets

IDENTIFYING WEIGHTING MATERIAL SAG WITH PULSED NEUTRON LOGS

BACKGROUND OF THE INVENTION

1. Field of Invention

The present disclosure is to a method of wellbore logging, and more specifically is to using a pulsed neutron log to identify the presence of weighting material sag in a wellbore annulus, such as barite, hematite, and the like.

2. Description of Prior Art

Oil producing wellbores that intersect a subterranean formation are typically lined with a string of casing that is cemented to the formation. Sometimes inserted within the cemented casing string is an inner casing string. A producing well will generally include a string or production tubing that is set within the inner casing string, and through which fluid produced from the formation is directed to the surface. The production tubing is removable so that during the life of the well, various remediation, repair, or flow enhancement operations can be conducted within the well. Tubing is sometimes removed completely, such as prior to termination of production from and/or killing of a well.

The annular spaces formed between the casings and/or tubing usually becomes filled with drilling fluid. Drilling fluid usually include particulates, over time in the stagnant annulus the particulates can precipitate in the fluid and settle out to form hard deposits in the annulus. The hard deposits can span the radius of the annulus and adhere to the respective surfaces of the tubulars. When a sufficient amount of particulate deposits to concentric tubulars, they are effectively coupled to one another. In instances where the precipitate adheres to the tubing and surrounding casing, removing the tubing requires cutting the tubing. The step of cutting can be done with a cutting tool having a blade, a chemical cutter, or a flame. However, the cutting location must be carefully determined. If the cutting depth is below the adhesion, the tubing cannot be removed. Or if the cutting depth is too far above the adhesion, an extended section of free pipe may remain, which is also undesirable.

SUMMARY OF THE INVENTION

Described herein is a method of wellbore operations, that in one example includes providing a downhole tool having a pulsed neutron source and detectors, disposing the downhole tool in production tubing that is inserted in the wellbore, causing gamma rays to scatter into the wellbore by directing neutrons from the tool into an annulus that circumscribes the tubular, detecting the gamma rays in the wellbore with the detectors to obtain a count rate of gamma rays detected by the detectors, obtaining a ratio of the count rate, comparing the ratio of count rate with a reference count rate ratio, and identifying the presence of a weighting material in the annulus based on the step of comparing the count rate. One example of weighting material includes barite. The reference count rate can be generated using a Monte Carlo simulation. The method can further include identifying the depth at which the weighting material is present to define a top of the weighting material depth, and severing the tubing above the depth of the weighting material. The count rate and reference count rate can be correlated to porosity. In this example, the reference count rate is made up of a series of count rate ratios for spaced apart detectors, and wherein count rate ratios are provided for different values of porosities of the formation. Optionally, the count rate ratios include ratios of count rates of gamma rays detected the detectors. The count rate ratios can further include ratios of count rates of inelastic and capture gamma rays detected by the detectors.

Another method of wellbore operations described herein includes disposing a downhole tool in a tubular inserted into the wellbore, directing neutrons from the downhole tool into an annulus that circumscribes the tubular and that generate gamma rays that scatter into the wellbore, obtaining a count rate by detecting the gamma rays scattering into the wellbore, comparing the count rate with a reference count rate, and identifying the presence of weighting material in the annulus based on the step of comparing the count rate. One example of weighting material includes barite. The reference count rate can optionally be created by Monte Carlo simulations of count rate ratios detected by reference detectors on a reference downhole tool. The weighting material can be a weighting material deposit, such as a barite deposit, that adheres to the tubular. The method can further optionally include identifying the depth at which the weighting material is present to define a weighting material depth, and severing the tubular at a depth above the weighting material depth. The count rate can be a ratio of a number of gamma rays detected by spaced apart detectors provided with the downhole tool. The count rate can in one example be a ratio of a number of inelastic gamma rays that are detected with the downhole tool to a number of capture gamma rays that are detected with the downhole tool. The detected count rates and reference count rates may be variable with changes in concentration of the weighting material in the annulus.

In yet another example, described herein is a method of wellbore operations that includes detecting radiation in a tubular disposed in the wellbore that has scattered from an annulus that circumscribes the tubular, comparing a count rate of the detected radiation with a reference count rate, and identifying a substance in the annulus based on the step of comparing the count rate with the reference count rate. Here the substance can be weighting material in the annulus that has adhered to the tubular. The method can further include severing and removing a portion of the tubular at a depth above where weighting material adheres to the tubular. The detected count rate and the reference count rate in one example relate to porosity of the substance in the annulus. Optionally, the reference count rate is generated using a Monte Carlo simulation. The count rate of the detected radiation can be made up of ratios of count rates of gamma rays detected by the detectors.

BRIEF DESCRIPTION OF DRAWINGS

Some of the features and benefits of the present invention having been stated, others will become apparent as the description proceeds when taken in conjunction with the accompanying drawings, in which.

Figure 1:
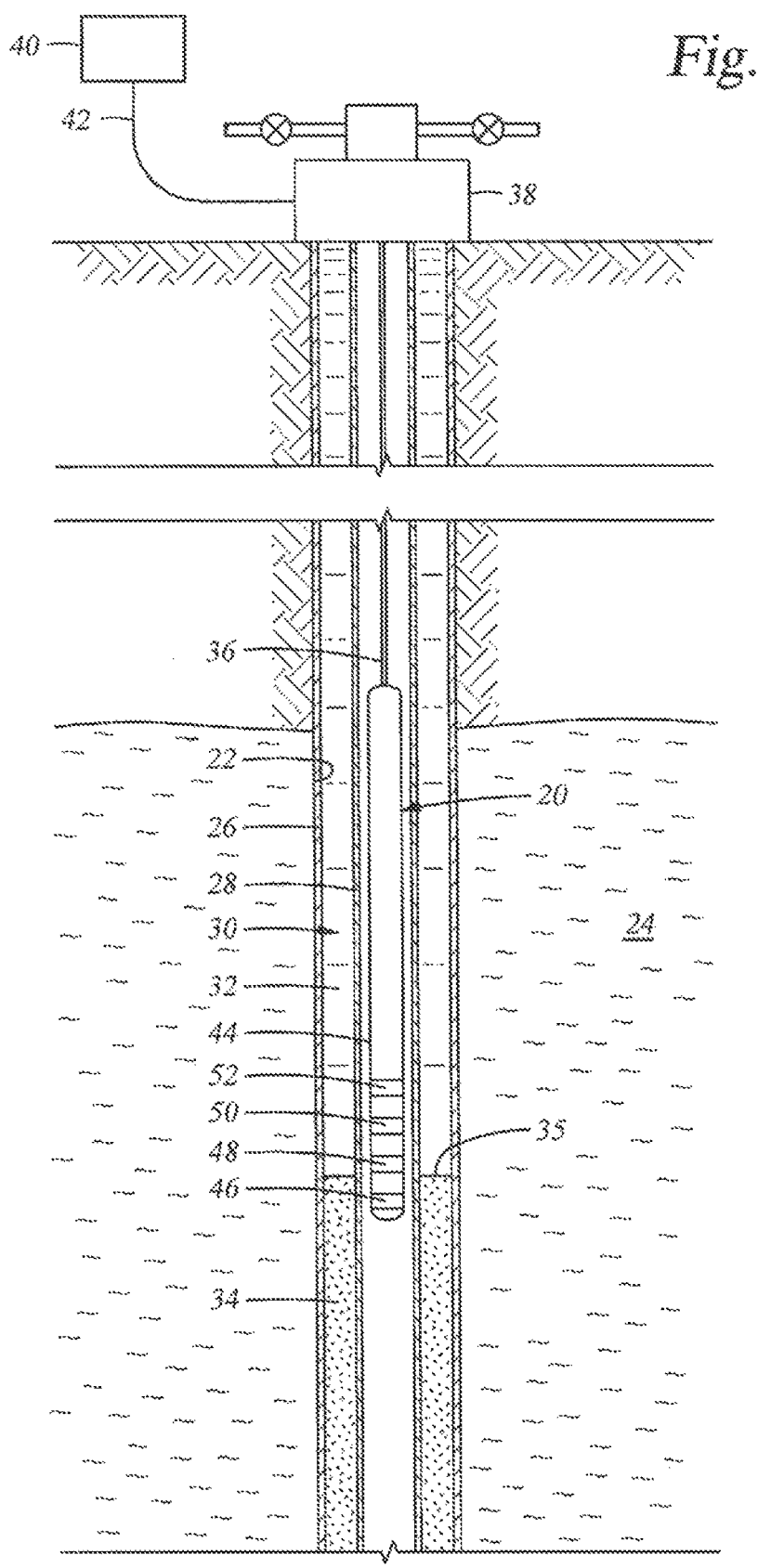
FIG. 1 is a side sectional view of an example of a downhole tool imaging a wellbore with pulsed neutrons.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows in a side sectional view an example of a downhole tool 20 that is disposed in a wellbore 22; where wellbore 22 is shown intersecting a subterranean formation 24. In the example, a string of casing 26 lines wellbore 22, and which can be cemented in place in wellbore 22. Production tubing 28 is shown inserted within casing 26 that defines an annulus 30 between the casing 26 and tubing 28. Further, wellbore fluid 32 is provided in the annulus 30 and which may include particular matter within such as a weighting material. Examples of weighting material include barite sag, hematite, and any other particulate typically entrained within downhole fluids that may coalesce to form a substantially solid like substance. Over time, some weighting material particulate has precipitated within the wellbore fluid 32, and formed a substantially solid weighting material deposit 34 shown formed on a lower end of annulus 30. A boundary 35 is defined at the interface between the weighting material deposit 34 and wellbore fluid 32.

Downhole tool 20 is disposed within wellbore 22 on a wireline 36 shown extending up to the opening of wellbore 22 and being threaded through a wellhead assembly 38. Optionally, coiled tubing, slick line, cable, or other means may be used for deploying downhole tool 20 within wellbore 22. A controller 40 is shown on surface for communicating with the downhole tool 20, a communication means 42 communicatingly couples controller 40 with wellhead assembly 38, and is shown as a hardwired assembly. Optionally, the communication means 42 may be wireless, fiber optic, or other means of relaying signals or data communication. In the example of FIG. 1, downhole tool 22 has an outer housing 44 and in which a neutron source 46 is shown provided within its lower end. A series of detectors 48, 50, 52 are also disposed within housing 44.

Figure 2:
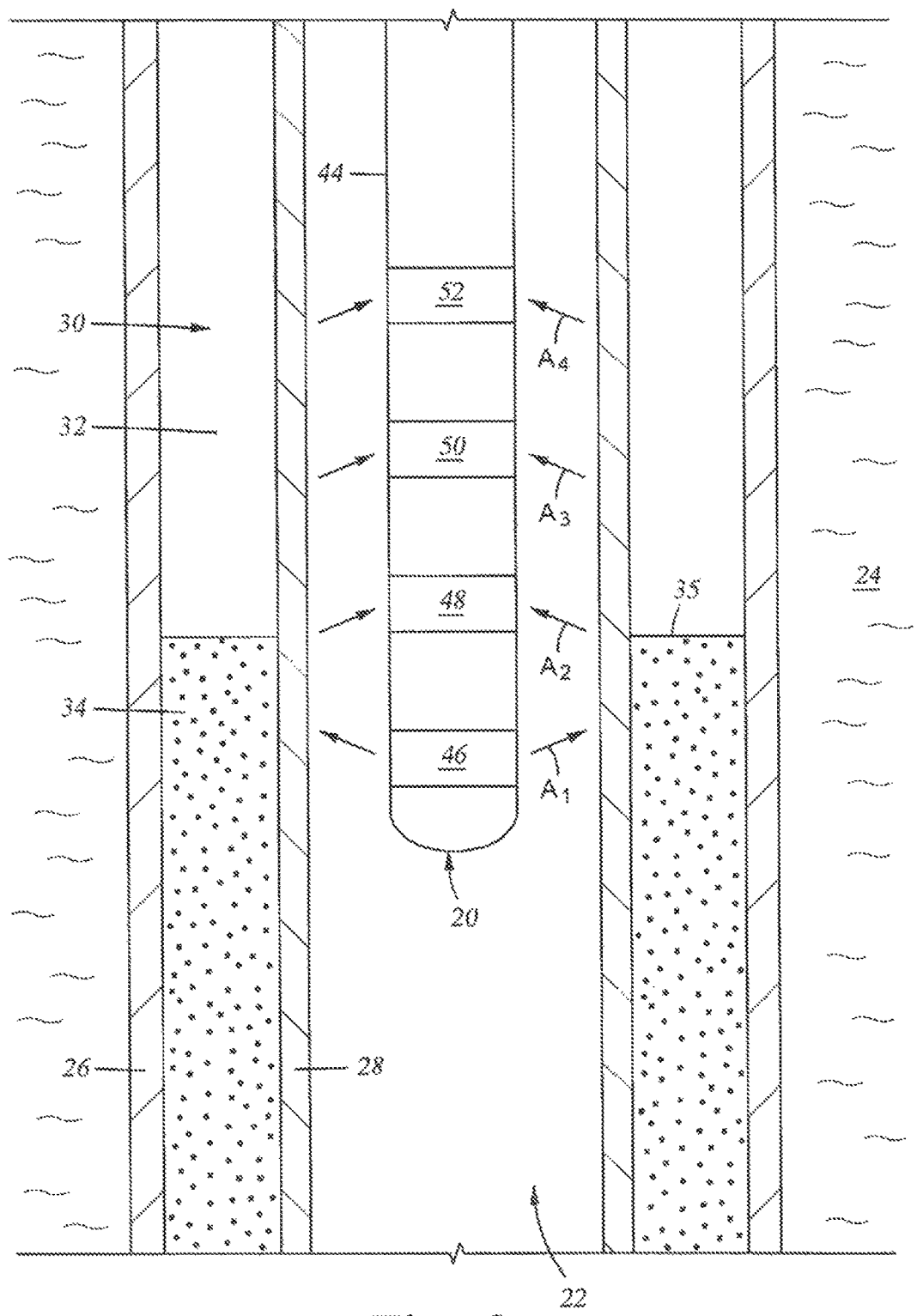
FIG. 2 is a detailed sectional view of a portion of the downhole tool of FIG. 1.

FIG. 2 shows in a side sectional view one example of wellbore operations using downhole tool 20, wherein neutron source 46 is activated and used to log within wellbore 22. More specifically, neutrons are generated by neutron source 46 and directed towards annulus 30 and along a path designated by arrow $A_1$. Neutrons scatter from substances within annulus 30 and generate gamma radiation which makes its way back into the wellbore 22 in the form of scattered gamma rays. Arrows $A_2$, $A_3$, $A_4$ schematically illustrate a possible path of the scattered gamma rays are directed towards detectors 48, detector 50, and detector 52 respectively. In one example, the detector 48 is referred to as a near detector, detector 50 is referred to as intermediate detector and detector 52 is a far detector. As shown, detector 48 is closest to neutron source 46, wherein detector 52 is disposed furthest from neutron source 46 and detector 50 is spatially disposed between detector 48 and detector 52. As will be described in more detail below, analyzing count rates within the detectors 48, 50, 52, as well as ratios of count rates of these detectors 48, 50, 52, and comparing those count rates with reference count rates, can detect the presence of the weighting material deposit 34, wellbore fluid 32, as well as the boundary 35. Moreover, analysis of the count rates can further identify if water is in the annulus 30. By correlating the known depth of the tool 20 within wellbore 22 at a time when the weighting material deposit 34 is detected can thereby provide an indication of the depth of the upper end of weighting material deposit 34. In one example, correlating the depth of the neutron source 46 at the time when count rates of the detectors 48, 50, 52 are obtained, can yield information about substances in the annulus 30, which is at the same, or substantially the same depth as the neutron source 46. Moreover, the method described herein can also yield information about the surrounding formation 46 at or roughly the same depth as the neutron source 46 when counts are detected.

Figure 3:
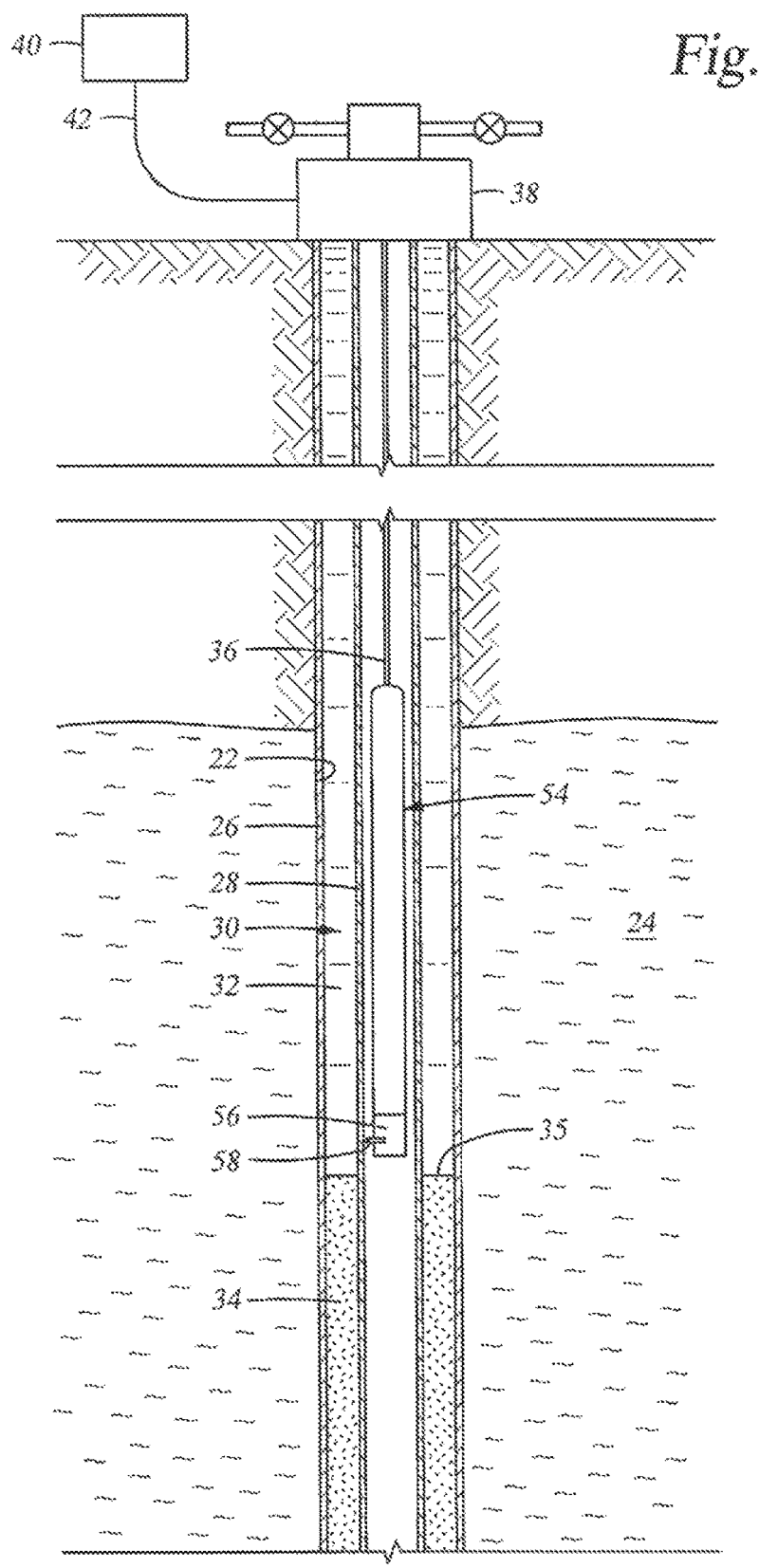
FIG. 3 is a side sectional view of an example of a cutting tool severing a tubular in the wellbore of FIG. 1.
Figure 4:
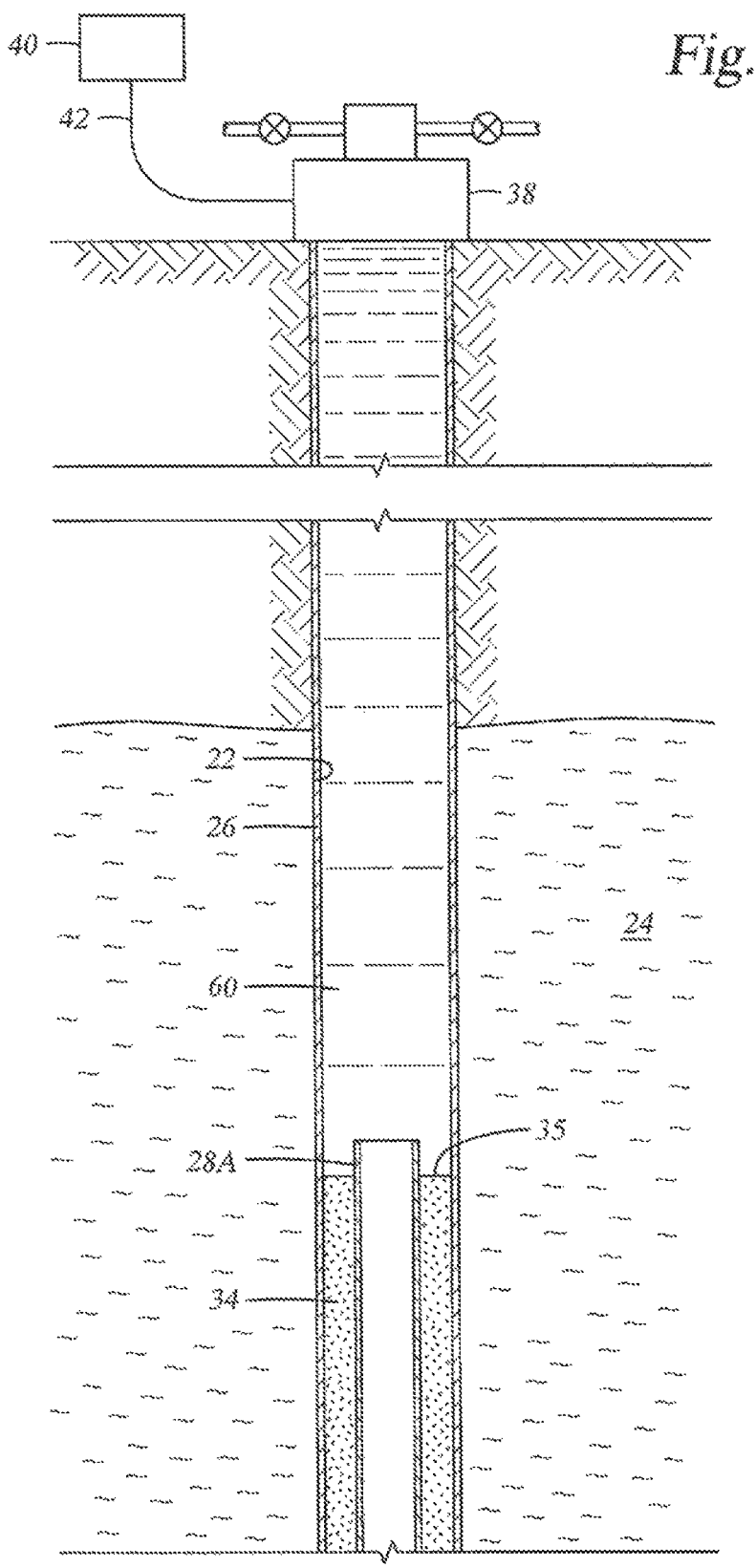
FIG. 4 is a side sectional view of an example of the wellbore of FIG. 3 with the severed portion of the tubular removed.

FIG. 3 shows in a side sectional view an example of a cutting tool 54 being disposed in wellbore and for cutting tubing 28. Various reasons may exist for severing the tubing 28, such as a desire to cease production from the well 22 and permanently cap the well. Cutting tool 54 is equipped with a cutting head 56 on its lower end that is shown having a blade 58 that is selectively deployed radially outward from cutting head 56. In the example of FIG. 3, by rotating cutting head 56 with respect to the rest of the body of cutting tool 54, the blade 58 can contact the inner surface of the tubing 28. Successive radial movement of blade 58 with rotation of cutting head 56 can thereby fully cut through the tubing 28. Referring now to FIG. 4, shown in side section view is that the severed portion of tubing 28 has been removed from well 22 thereby leaving the remaining portion of tubing 28A within well 22. Fluid 60, such as a cement, may be disposed within well 22 thereby capping well 22 so that it may no longer be produced.

A pulsed neutron tool that may be used in the method described herein is described in Trcka, et al, U.S. Pat. No. 7,365,308 which is assigned to the assignee of the present application, and is incorporated by reference herein in its entirety and for all purposes.

Figure 5:
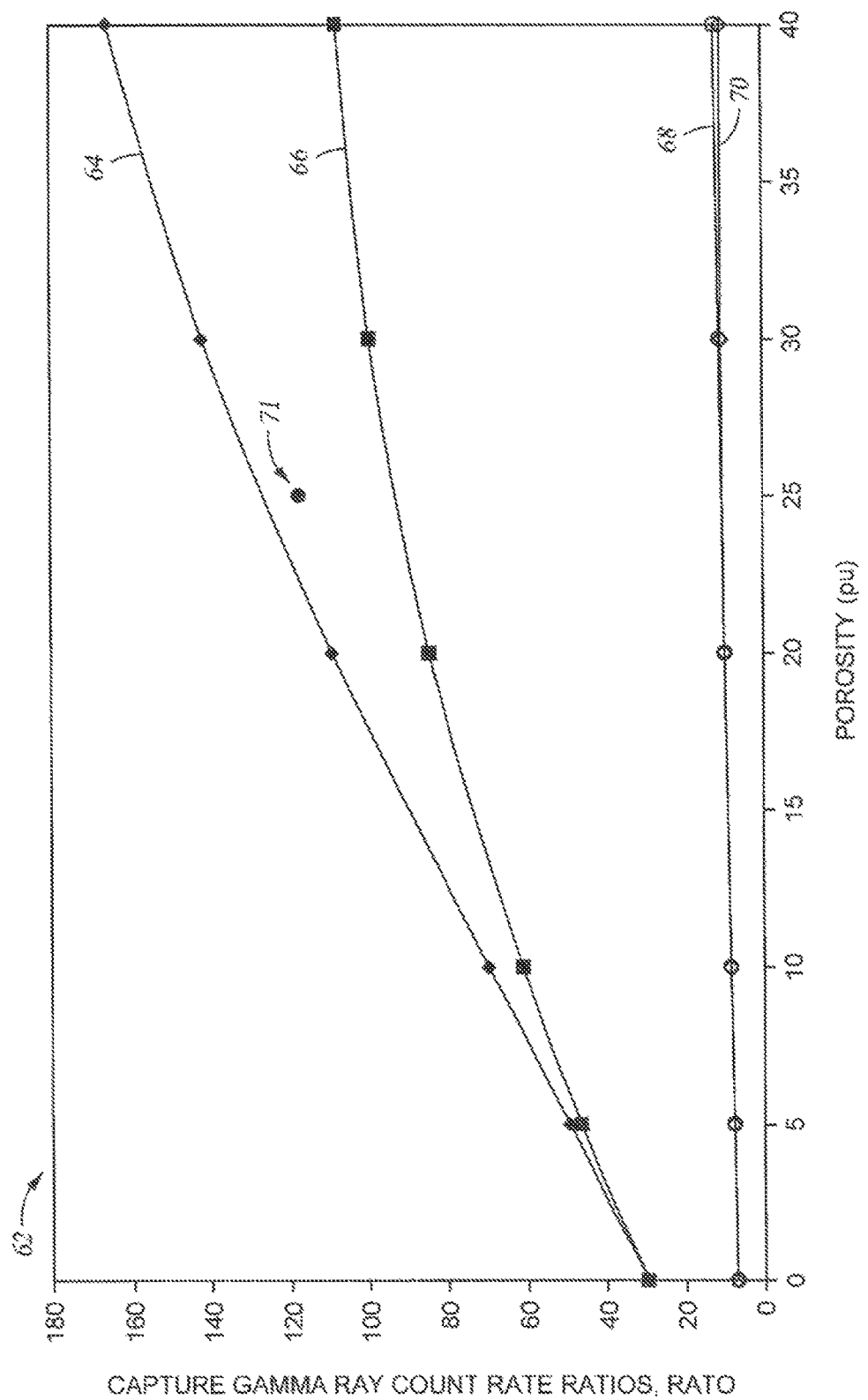
FIGS. 5 and 6 are a graphs with plots of detected gamma ray count ratios versus surrounding porosity, where the count ratios are for near and far detectors.

Referring now to FIG. 5, shown therein is a graph 62 having plots 64, 66, 68, 70 which were synthetically generated using a Monte Carlo simulation, and which represent examples of count rate ratios vs. porosity of a formation adjacent a wellbore. More specifically, plot 64 is a graph of data points that represent simulation results of a ratio of count rates for a reference far receiver over count rates for a reference near receiver hypothetically disposed on a reference downhole tool; and taken over a range of porosity of the adjacent formation from 0 to 45 porosity units ("pu"). For clarity, reference downhole tool and reference near, far, and intermediate, detectors are hypothetical elements used in the Monte Carlo simulation, but have the same or substantially similar characteristics and spacing of the downhole tool 20 and detectors 48, 50, 52 of FIG. 1. Further, the gamma rays considered in this simulation in graph 62 are assumed to be capture gamma rays. In the example of FIG. 5, plot 64 provides an illustration of a count rate ratio to porosity of formation around wellbore 22 expected when the downhole tool 20 is positioned in wellbore 22 so that the neutron source 46 is disposed adjacent a weighting material deposit 34 (FIG. 1). Plot 66 also represents reference near to far detector count rate ratios of capture gamma rays versus formation porosity, and where the substance encountered is water. Plot 68 illustrates the simulated example of capture gamma rays encountering barite over a count rate ratio of the near and intermediate detectors. Plot 70 illustrates data of capture gamma ray ratios for that scattered from water and are a ratio of the near and intermediate detectors. As illustrated in FIG. 5, plots 64 and 66, which represent hypothetical count rate ratios of the reference near and far detectors on a reference downhole tool, are spaced apart from one another more than plots 68 and 70, which represent hypothetical count rate ratios between reference near and intermediate detectors. As shown in FIG. 5, the count rate ratio values of plots 64, 66 change with respect to the formation porosity. The presence of weighting material sag can be determined by comparing measured data point 71 to plots 64 and 66. Measured data point 71 represents a count rate ratio obtained at a depth in a wellbore where the porosity of the surrounding formation was 25 pu. As measured data point 71 is closer to plot 64, it implies that a weighting material is present in the annulus 30, in this specific case barite sag, at the depth where measured data point 71 was obtained. For simplicity only a single measured data point 71 is shown, however, data points can be obtained at every depth in the wellbore being imaged so that the substance in the surrounding annulus 30 at those depths can be identified.

Figure 6:
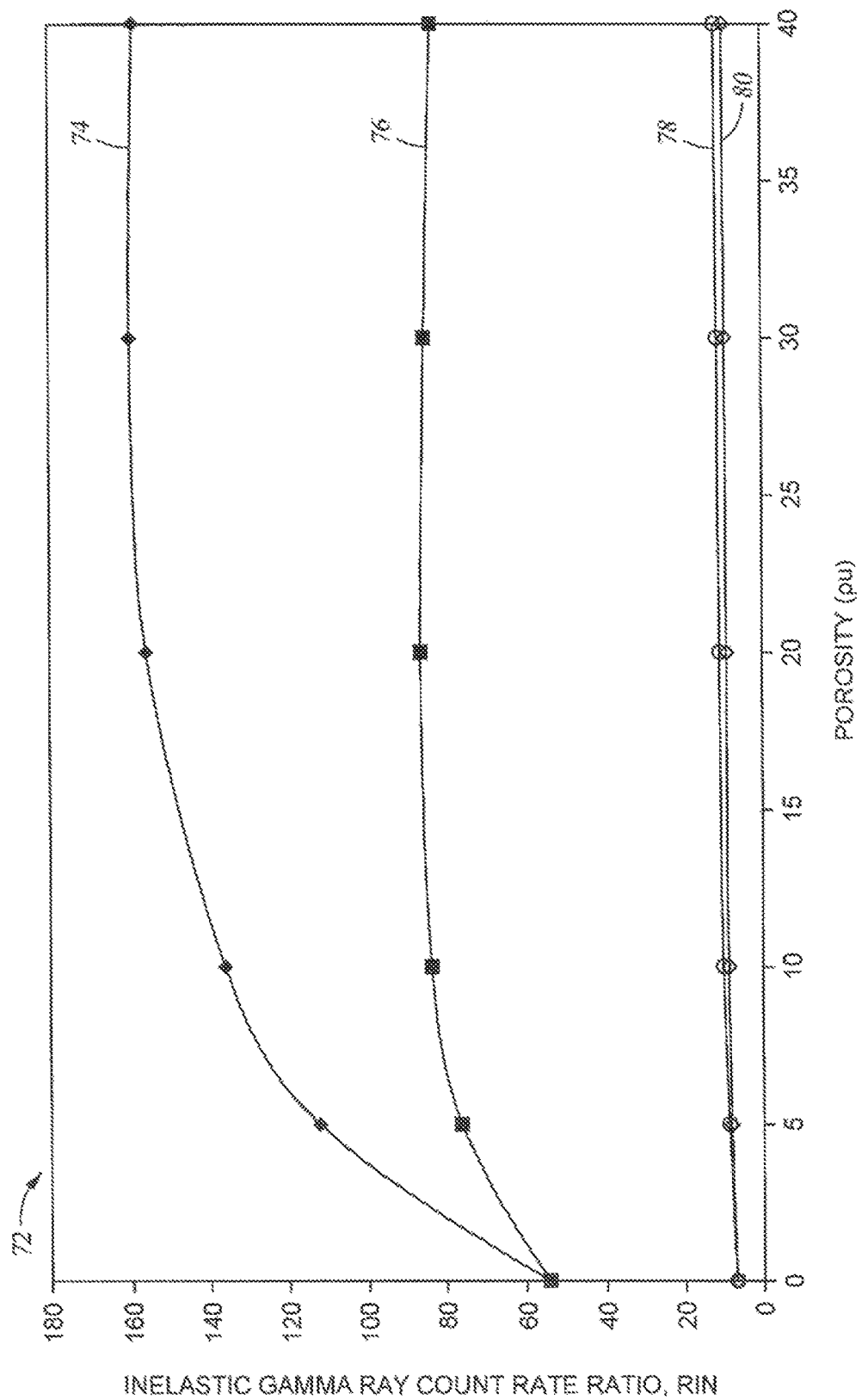

Schematically shown in FIG. 6 is a graph 72 that represents data also generated from a Monte Carlo simulation, except the gamma rays here are considered to be inelastic gamma rays. Plots 74 and 76 represent ratios of gamma rays detected at reference near and far detectors on a reference downhole tool and over a range of porosity. Hypothetically detected gamma rays used to generate plot 74 represent gamma rays scattered from weighting material, whereas plot 76 represents gamma rays being scattered from water. In an example embodiment, the weighting material includes barite. Plots 78 and 80 represent ratios of gamma rays detected at reference near and intermediate detectors and over a range of porosity. Plot 78 represents gamma rays being scattered from weighting material, and plot 80 represents gamma rays scattering from water. Like plot 62 of FIG. 5, shown in plot 72 is how considering count rate ratios of reference near and far detectors on a reference downhole tool yields plots 74, 76 having portions that are spaced apart from one another at distances greater than from plots 78, 80; which are formed from count rate ratios of reference near and intermediate detectors. In one example, inelastic gamma ray count rate ratios ("RIN") are used for determining the sag; in this example, the measured data is compared to the reference plots given by 74 and 76. In examples where the measured data agrees with plot 74 indicates a weighting material sag in the annulus 30. Otherwise, there is an indication that water in the annulus 30.

Figure 7:
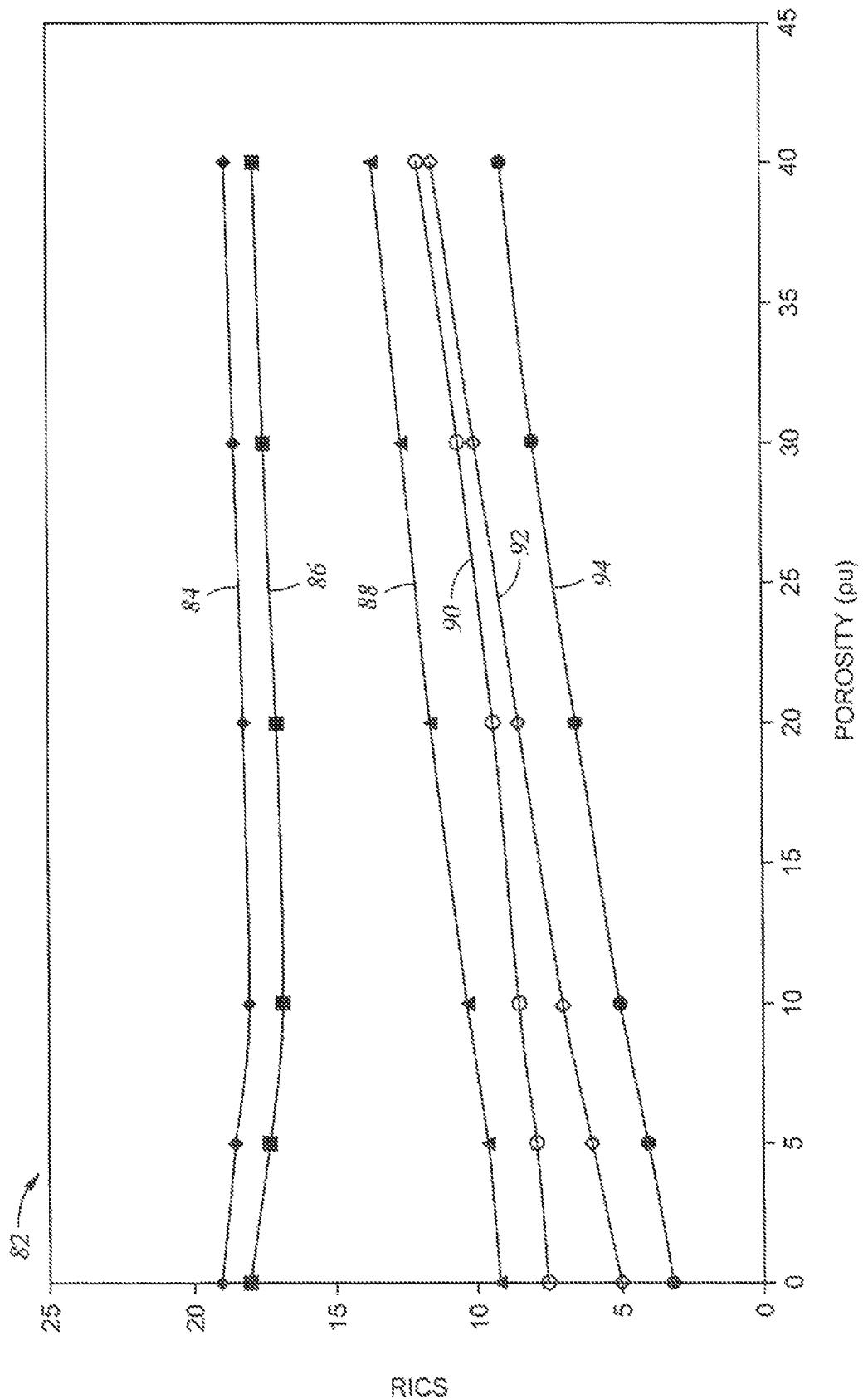
FIG. 7 is a graph with a plot of detected gamma ray count ratios versus surrounding porosity, where the count ratios are for inelastic and capture gamma rays.

FIG. 7 illustrates graph 82, which like graphs 62 and 72 of FIGS. 5 and 6 was generated with a Monte Carlo simulation. Different though in graph 82 is that the ratios of count rates are not of count rates of different detectors, instead the ratios are of inelastic gamma rays to capture gamma rays at each of the reference detectors. More specifically, plot 84 represents count rate ratios of inelastic gamma rays to capture gamma rays that have scattered from water versus porosity, and that were detected by a reference near detector. Similarly, plot 86 shows count rate ratios of inelastic to capture gamma rays that have scattered from weighting material versus porosity, and which were detected by a reference near detector. Plot 88 represents count rate ratios of inelastic to capture gamma rays that scattered from water versus porosity, and that were detected by reference intermediate detector. Plot 90 shows count rate ratios of an elastic gamma rays that scattered from a weighting material deposit 34 in the annulus 30 (FIG. 1) versus porosity, and that were detected by a reference intermediate detector. Plots 92 and 94 show count rate ratios of intermediate to capture gamma rays versus porosity that were captured by the far detector 52, and which scattered from water or barite respectively. Accordingly, as there is separation and distinction between plots 84, 86, 88 90, 92, and 94 of FIG. 7, the presence of weighting material, weighting material deposits, water, or other substances can be identified with an analysis of count rate ratios of inelastic to capture gamma rays detected by various detectors of a downhole tool. This can be done by comparing the measured data point to the reference plots to see if it agrees with the water case or the case with concentrated weighting material in the annulus. Similar to the measured data point 71 of FIG. 5, measured data points obtained in actual wellbores can be compared to the plots of FIGS. 6 and 7 in order to obtain information about the substances in the surrounding annulus.

In one example of operation, downhole tool 20 of FIG. 1 is disposed in wellbore 22, and neutrons are generated by the neutron source 46 as the tool 20 is moved along the depth of the wellbore 22. As described above with regard to the embodiment of FIG. 2, scattered gamma rays are detected by the detectors 48, 50, 52, and relationships of ratios of count rates and different types of gamma rays (i.e. inelastic to capture gamma rays) versus formation porosity are generated from the detected data. The count rate ratios in the relationships are further correlated to the depths in the wellbore 20 (FIG. 1) where the counts were detected. Comparing the relationships (including the known depths where the counts were received) to one or more of the graphs 62, 72, 82 (FIGS. 5-7), can be used to identify substances in the annulus 30.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of wellbore operations comprising:
providing a downhole tool having a pulsed neutron source and detectors;
disposing the downhole tool in production tubing that is inserted in the wellbore;
causing gamma rays to scatter into the wellbore by emitting neutrons from the tool into an annulus that circumscribes the tubular;
detecting the gamma rays in the wellbore with the detectors to obtain a count rate of gamma rays detected by each of the detectors;
obtaining a ratio of each of the count rates;
comparing each of the ratios of count rates with a reference count rate ratio, the count rate ratios comprising ratios of count rates selected from the group consisting of inelastic gamma rays, capture gamma rays, and a combination of inelastic and capture gamma rays detected by detectors; and
identifying the presence of weighting material in the annulus based on the step of comparing the ratios of the count rates.

2. The method of claim 1, wherein the reference count rate ratio is generated using a simulation algorithm.

3. The method of claim 1, wherein the weighting material comprises barite, the method further comprising, identifying the depth at which the barite is present to define a barite depth, and severing the tubing at a depth above the barite depth.

4. The method of claim 1, wherein the count rate ratio and reference count rate ratio are correlated to porosity.

5. The method of claim 4, wherein the reference count rate ratio comprises a series of count rate ratios for spaced apart detectors, and wherein count rate ratios are provided for different values of concentration of weighting material in the annulus.

6. The method of claim 1, wherein the count rate ratios comprise ratios of count rates of gamma rays detected by multiple detectors.

7. A method of wellbore operations comprising
disposing a downhole tool in a tubular inserted into the wellbore;
directing neutrons from the downhole tool into an annulus that circumscribes the tubular and that generate gamma rays that scatter into the wellbore;
detecting count rates at different locations in the wellbore of the gamma rays scattering into the wellbore;
obtaining a count rate ratio based on the step of detecting count rates, the count rate ratio comprising a ratio of inelastic gamma rays that are detected with the downhole tool to capture gamma rays that are detected with the downhole tool;
comparing the count rate ratio with a reference count rate ratio; and
identifying the presence of a weighting material in the annulus based on the step of comparing the count rate ratio with the reference count rate ratio.

8. The method of claim 7, wherein the reference count rate comprises algorithm simulations of count rate ratios and count rate ratios detected by reference detectors on a reference downhole tool.

9. The method of claim 7, wherein the weighting material comprises one or more of a weighting material deposit or a barite deposit that accumulates adjacent to the tubular.

10. The method of claim 7 further comprising, identifying the depth at which the weighting material is present to define a weighting material depth, and severing the tubular at a depth above the weighting material depth.

11. The method of claim 7, wherein the count rate ratio comprises a ratio of gamma rays detected by spaced apart detectors provided with the downhole tool.

12. The method of claim 7, wherein the detected count rate ratios and reference count rate ratios are variable with changes in porosity of the formation.

13. A method of wellbore operations comprising:
detecting count rates of radiation that has scattered into the wellbore from an annulus that circumscribes a tubular in the wellbore;
obtaining a count rate ratio between count rates detected at different locations in the wellbore and that are at different distances from a source of the radiation;
comparing the count rate ratio with a reference count rate ratio; and
identifying a substance in the annulus based on the step of comparing the count rate ratio with the reference count rate ratio.

14. The method of claim 13, wherein the substance comprises barite in the annulus that has accumulated adjacent the tubular.

15. The method of claim 14, further comprising severing and removing a portion of the tubular at a depth above where barite is accumulated.

16. The method of claim 13, wherein the detected count rate and the reference count rate relate to an amount of barite present in the annulus.

17. The method of claim 13, wherein the reference count rate is generated using an algorithm simulation.

18. The method of claim 13, wherein the count rate of the detected radiation comprises ratios of count rates of gamma rays detected by different detectors.

* * * * *